US008616584B2

(12) United States Patent
Scholz et al.

(10) Patent No.: US 8,616,584 B2
(45) Date of Patent: Dec. 31, 2013

(54) VALUE DOCUMENT, PRODUCTION AND VERIFICATION OF VALUE DOCUMENTS

(75) Inventors: Ulrich Scholz, Buchbach (DE); Gregor Grauvogl, Oberhaching (DE); Ulrich Magg, Feldgeding (DE); Thomas Giering, Kirchseeon (DE); Franz Müller, München (DE); Klaus Thierauf, München (DE)

(73) Assignee: Giesecke & Devrient GmbH, Munich (DE)

( * ) Notice: Subject to any disclaimer, the term of this patent is extended or adjusted under 35 U.S.C. 154(b) by 989 days.

(21) Appl. No.: 11/988,867

(22) PCT Filed: Jul. 18, 2006

(86) PCT No.: PCT/EP2006/007068
§ 371 (c)(1), (2), (4) Date: May 1, 2008

(87) PCT Pub. No.: WO2007/009756
PCT Pub. Date: Jan. 25, 2007

(65) Prior Publication Data

US 2009/0051158 A1 Feb. 26, 2009

(30) Foreign Application Priority Data

Jul. 19, 2005 (DE) ......................... 10 2005 033 598

(51) Int. Cl.
*B42D 15/00* (2006.01)
*G09C 3/00* (2006.01)

(52) U.S. Cl.
USPC ................... 283/91; 283/72; 283/74; 283/82; 283/83; 283/94; 283/901

(58) Field of Classification Search
USPC .............. 283/72, 74, 82, 83, 91, 94, 117, 901
See application file for complete search history.

(56) References Cited

U.S. PATENT DOCUMENTS

| | | | | |
|---|---|---|---|---|
| 3,621,250 | A | 11/1971 | Wetzstein | |
| 4,136,229 | A | 1/1979 | Godet et al. | |
| 4,452,843 | A | 6/1984 | Kaule et al. | |
| 4,557,596 | A | 12/1985 | Müller et al. | |
| 5,149,139 | A | 9/1992 | Kaule | |
| 6,506,476 | B1 * | 1/2003 | Kaule et al. | 283/74 |
| 6,974,623 | B2 * | 12/2005 | Schwenk | 283/72 |
| 2001/0043396 | A1 | 11/2001 | Lee | |
| 2003/0103905 | A1 * | 6/2003 | Ribi | 283/114 |
| 2004/0051297 | A1 | 3/2004 | Raksha et al. | |

(Continued)

FOREIGN PATENT DOCUMENTS

| | | |
|---|---|---|
| DE | 2125336 | 12/1971 |
| DE | 27 47 349 A1 | 5/1979 |

(Continued)

OTHER PUBLICATIONS

Search Report German Patent Office relating to German Patent Appl. No. 10 2005 033 598.5, Oct. 17, 2005.

*Primary Examiner* — Dana Ross
*Assistant Examiner* — Justin V Lewis
(74) *Attorney, Agent, or Firm* — Workman Nydegger

(57) ABSTRACT

A sheet-shaped document of value (BN) has luminescent feature substances (20, 21). Preferably, one luminescent feature substance is present over the entire sheet-shaped document and has a low concentration, whereas a second luminescent feature substance is present at certain partial areas and has a higher concentration.

6 Claims, 2 Drawing Sheets

(56) References Cited

U.S. PATENT DOCUMENTS

| | | | |
|---|---|---|---|
| 2004/0239097 | A1 | 12/2004 | Boehm et al. |
| 2006/0127649 | A1 | 6/2006 | Keller et al. |

FOREIGN PATENT DOCUMENTS

| | | | |
|---|---|---|---|
| DE | 35 14 852 | C2 | 10/1987 |
| DE | 31 21 491 | C2 | 3/1989 |
| DE | 41 14 732 | A1 | 11/1992 |
| DE | 196 11 383 | A1 | 9/1997 |
| DE | 101 48 122 | A1 | 4/2003 |
| DE | 103 46 685 | A1 | 5/2005 |
| EP | 1 488 935 | A2 | 12/2004 |
| WO | WO 00/39397 | | 7/2000 |
| WO | WO 2004/028825 | A2 | 4/2004 |
| WO | 2005036481 | A1 | 4/2005 |

* cited by examiner

VALUE DOCUMENT, PRODUCTION AND VERIFICATION OF VALUE DOCUMENTS

FIELD OF THE INVENTION

The invention relates to a sheet-shaped document of value with at least one luminescent feature substance and the manufacturing and checking of such a document of value.

BACKGROUND

Sheet-shaped documents of value can be for example bank notes, checks, share certificates, tickets, coupons, deeds, vouchers, high-quality admission tickets, but also other papers at risk of forgery, such as passports or other identification documents, or also security papers not yet or not yet completely printed or otherwise processed which are used for producing e.g. bank notes. Although not restricted to it, in the following by way of example bank notes are described as such documents of value.

Within the terms of the present invention, a luminescent feature substance is a substance consisting of one single component or of a mixture of a plurality of components which show a luminescence behavior.

Such luminescent feature substances usually are incorporated directly into the paper or the printing ink for printing the bank notes.

For criminal purposes it is helpful, when for the protection of bank notes feature substances are used which are detectable even after the combustion of the document, in order to being able to ensure that an unrecognizable residue of combustion really originates from authentic documents. On the other hand it must be prevented, that the feature substances contained in the ashes of the burnt documents of value are regained and used for the preparation of forgeries.

For solving this problem according to the WO 00/39397 A1 of the applicant it is proposed to provide a document of value with a first machine checkable physical or chemical property and with a second machine checkable physical or chemical property, the first and second checkable property being machine checkable separately from each other, the document of value losing the first checkable property at a first temperature, and the document of value losing the second checkable property at a second temperature which is different from the first temperature.

For this purpose, however, there are relatively few suitable feature substances. Therefore, there is a demand for alternatives hereto, so that a larger group of feature substances can be used for protecting the authenticity of documents of value.

Therefore, it is a problem of the present invention to provide an alternative sheet-shaped document of value having luminescent feature substance, which after ashing cannot be used for the production of forgeries without an unreasonably high effort. In addition, the manufacturing and checking of such a document of value is stated.

SUMMARY

The present invention thus starts out from the idea to provide a sheet-shaped document of value with a luminescent feature substance, which is present all over with low concentration as well as at certain partial areas with higher concentration.

The feature substance in the partial areas with higher concentration preferably will be present in a different form than in the surrounding areas with low concentration.

In this way, on the one hand, the luminescent feature substance, for example, can be uniformly incorporated into the substrate mass. On optically exciting the substrate, this first form of incorporation will be connected with a low and uniform intensity of the luminescence radiation over the entire paper surface.

On the other hand, this feature substance is also present in a different form, e.g. in the form of mottling fibers, planchets, locally blown on, sprayed or in the form of an additional printed element, at discrete positions in the paper. With the same optical excitation of the paper this second form of incorporation will be connected with a higher luminescence intensity at only certain local partial areas of the entire paper surface. If the feature substances according to the invention are integrated into a fiber, planchet or the like, in addition to the feature substances there can be incorporated still further feature substances into these fibers. A sensor, which detects the feature that is also present in the paper, then will detect the variation of the feature signal according to the invention, while a sensor for the second substance without background will only detect the second feature.

The luminescent feature substance forming the quasi-homogeneous background can alternatively also be mixed into an opaque printing ink or a transparent printing ink and printed onto the bank note or in an intermediate layer of a substrate consisting of a plurality of layers, whereby certain areas can be left free (e.g. lookthrough windows).

On illumination with a radiation exciting the luminescence of the document of value along a track, the measured luminescence radiation thus will have a uniformly distributed base intensity and one or a plurality of peaks with increased intensity only present at certain positions of the track.

The combination of these two forms of incorporation and the resulting overlapping of a uniform luminescence radiation having low intensity with local peaks of higher intensity at defined positions in the measurable luminescence spectrum of the document of value has the advantage, that for a forger the effort to imitate the correct combination of the two forms of incorporation for the forgeries will be unreasonably high even when he comes into possession of the combustion ash of bank notes.

It shall be emphasized, that the incorporation of the feature substances into the paper of course can also mean an application onto the paper, e.g. by printing or fastening of transfer elements, or that instead of such an incorporation such an application can be effected.

For features whose intensities are reduced by printing inks, there can be provided that the printing inks are provided with the same feature substance in such a way that such a reduction is equalized by the printing ink. While the feature signal, when viewed all over the bank note, without any additional feature in the printing ink weakens in the areas of the printing ink, the feature signal in the bank note provided according to the invention will be approximatively homogeneous, the losses caused by e.g. absorptions of the printing ink can be reduced or even overcompensated.

The authentication check of such sheet-shaped documents of value having luminescent feature substance is checked or carried out according to the invention by recording and evaluating measuring values of the checked document of value, in order to determine whether the feature substance is present all over with low concentration as well as at certain partial areas with higher concentration.

Besides such a simple detection of the existence of partial areas with higher concentration, for a more selective determination the properties of the distributions can also be determined. In case of statistical distributions the statistical parameters of the distributions, e.g. average values and standard deviations, quantile or other statistical parameters are suitable as additional criteria for checking. In the case of deterministic distributions there can be examined both the distributions according to the standards and the statistical deviations therefrom.

The measuring values or quantities derived therefrom can also be recorded during the production of the bank notes and be deposited in a data base for later checks. Alternatively, the result of the check and/or quantities derived therefrom, e.g. encrypted quantities, can be applied onto the bank note and in this way are available for a later check. This can be effected e.g. via numbering apparatuses, ink-jet printing methods, digital printing methods, laser-assisted ablation or changing.

According to a preferred development of the document of value the feature substance is distributed on or in the document of value in such a way that when the document of value is illuminated with a radiation exciting the luminescence of the feature substance, a luminescence radiation measured along a track has a uniformly distributed base intensity and one or a plurality of peaks with increased intensity only present at certain positions of the track. A track here in particular also means a substantially linear stripe on the document of value, in particular from an edge of the document of value to another edge of the document of value, whose width is sufficient for a detection of the luminescence radiation from the stripe with the help of a detector.

Furthermore, the document of value can have various partial areas of increased concentration, which differ from each other regarding the pattern of intensity of the luminescence radiation when illuminated with excitation radiation of constant intensity and/or regarding their geometric form.

Moreover, a quantity derived from a pattern of intensity of the luminescence radiation of the feature substance on illumination with excitation radiation of constant intensity and/or a quantity derived from a statistical distribution of the pattern of intensity of the luminescence radiation of the feature substance of the document of value on illumination with excitation radiation of constant intensity can be applied onto the document of value as an information. In the manufacturing method preferably a quantity derived from a pattern of intensity of the luminescence radiation of the feature substance on illumination with excitation radiation of constant intensity and/or a quantity derived from a statistical distribution of the pattern of intensity of the luminescence radiation of the feature substance on illumination with excitation radiation of constant intensity is applied onto the document of value and/or is deposited in an external data base as an information. In the checking method then preferably can be determined the pattern of intensity of the luminescence radiation of the feature substance on illumination with excitation radiation of constant intensity and/or data of a statistical distribution of the pattern of intensity of the luminescence radiation of the feature substance of the document of value on illumination with excitation radiation of constant intensity and be used for assessing the authenticity or the state of the document of value. The checking device then preferably is adapted to this purpose.

BRIEF DESCRIPTION OF THE DRAWINGS

In the following the invention is explained and described in more detail with reference to the accompanying figures.

DETAILED DESCRIPTION OF VARIOUS EMBODIMENTS OF THE DISCLOSURE

Figure 1:
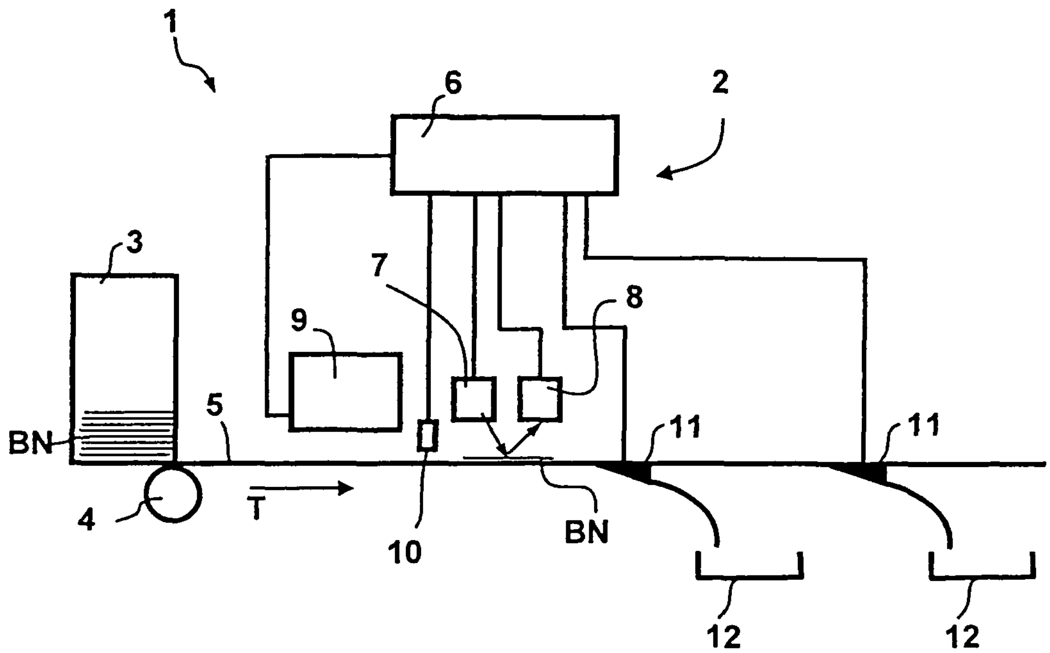
FIG. 1 shows in a schematic side view the structure of a bank note sorting machine with a checking apparatus according to the invention according to a first embodiment.

Although the checking apparatus according to the invention can be used in all bank note processing machines, such as e.g. in money depositing machines, vending machines or handheld checking devices, in the following by way of example and with reference to FIG. 1 the use in a bank note sorting machine 1 is described, which is shown in a schematic side view.

The bank note sorting machine 1 in the way known in the art comprises an input pocket 3, in which the bank notes BN to be checked are inserted in a stacked fashion. These bank notes are separately removed from the stack with the help of a singler 4 and are transported along a transport path 5 past a checking apparatus 2 in the direction of T. Here the checking device 2 has an EDP-aided evaluation unit 6, which is connected with an illuminating apparatus 7 for exciting the luminescent feature substances 15 in the bank note paper, a sensor device 8 for detecting the luminescence radiation emitted by the checked bank note BN and a light barrier 10, which is located immediately upstream of the illuminating apparatus 7 and the sensor device 8. Besides the light barrier 10 the transport path 5 can also contain further not shown light barriers, in order to be able to clearly determine the position of the individual bank notes BN in the transport path 5 and in the checking device 2. Furthermore, the sensor device 2 can have a state sensor 9, which in particular serves for determining the degree of soiling of the bank notes BN. A plurality of diverters 11 are located downstream of the checking device 2, so as to give out the bank notes into one of a plurality of pockets 12 dependent on the checking result obtained in the evaluation unit 6.

Bank note sorting machine 1 in particular is characterized by the structure and the mode of functioning of the checking apparatus 2, which serves for detecting luminescent feature substances in bank notes BN according to the invention.

Figure 2:
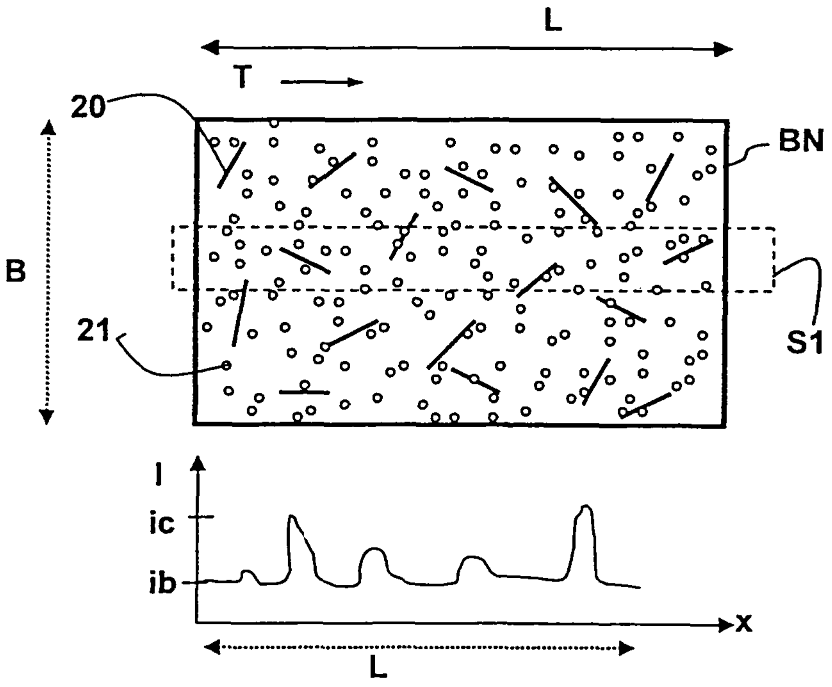
FIG. 2 shows a schematic view from above onto an authentic bank note BN according to the invention according to an embodiment, which can be checked with the checking apparatus according to FIG. 1

Before this checking apparatus 2 is explained, at first the manufacturing and the structure of a bank note BN according to the invention to be checked with such checking apparatus shall be explained, as it is shown by way of example in FIG. 2.

Bank note BN has circularly drawn pigments 21 of a luminescent feature substance that are incorporated with a low surface density and volume density all over the entire bank note surface having length L and width B and are uniformly distributed in the paper pulp. Furthermore, into the paper pulp are also incorporated mottling fibers 20 symbolized by small lines, which have the same luminescent feature substance. When viewed all over the entire bank note surface or the entire bank note volume, the surface density or volume density of the mottling fibers is lower than that of the pigments, but, however, the local concentration of the feature substance in the mottling fibers 20 is distinctly higher than the concentration of the feature substance of the pigments 21 in the surrounding areas of the bank note surface. The incorporation of the pigments 21 and the mottling fibers 20 here can be effected in the way known in the art.

It shall be emphasized, that the pigments 21 or the mottling fibers 20 only for clarity's sake are highlighted in FIG. 2, basically these elements can be not visible or largely invisible for the naked human eye.

Basically, the spatial distribution and surface density or volume density of the pigments 21 and mottling fibers 20 can also be different, the only substantial thing is that when illuminated with a radiation exciting the luminescence of the feature substance, the first form of incorporation of the feature substance, i.e. here the pigments 21, has a luminescence of an intensity more uniformly distributed over the bank note surface than that of the second form of incorporation of the same feature substance, i.e. here the mottling fibers 20.

Exactly this property according to the invention of authentic bank notes BN is calibrated by the checking apparatus 2. For this purpose the bank note BN passing the illumination apparatus 7 is illuminated with the help of the illumination apparatus 7 in transport direction T along a track S1. The contour line of this track S1 is shown in FIG. 2 by a dashed line S1. The sensor device 8 serves for detecting the luminescence radiation of the bank note BN emitted by the illuminated track S1. The measuring is effected at one or a plurality of frequencies and/or frequency bands characteristic of the respective luminescence radiation.

The lower half of FIG. 2 schematically shows a pertinent measuring curve of the sensor device 8. Specifically, the measured intensity I of the luminescence radiation of a checked bank note BN is plotted against the measuring place x extending in the direction of T. It becomes evident, that the measuring curve has a base level of intensity ib with individual local peaks e.g. the maximum intensity ic at certain measuring positions. The intensity ib here comes from the luminescence radiation of the pigments 21 and the individual peaks with maximum intensity ic from the luminescence radiation of the mottling fibers 20 which are located in the measuring track S1.

In the evaluation unit 6 can be checked, whether on given excitation the measuring curve shows a pattern characteristic for authentic bank notes, i.e. that for example the individual intensities ib and ic or their ratio are correct and/or whether the local peaks are at the right positions of the bank notes BN along the measuring track S1. If this is not the case, the checked bank note BN is classified as a forgery or at least as a suspected forgery. Otherwise, the bank note BN can be classified as authentic, subject to the result of other optionally further measurements.

Figure 3:
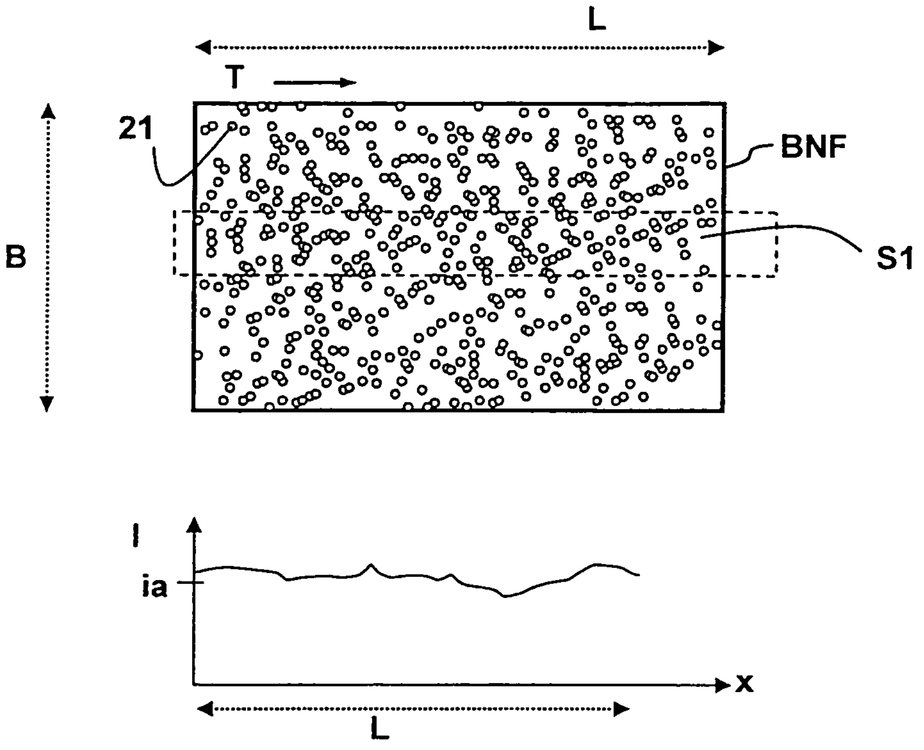
FIG. 3 shows a schematic view from above, corresponding to that of FIG. 2, onto a bank note forgery BNF, which can be checked with the checking apparatus according to FIG. 1.

When because of too much wear such an authentic bank note BN is withdrawn from circulation and destroyed and a forger comes into the possession of the combustion ash of the bank note BN and uses it for producing forgeries, it can be expected that such a forgery usually has the form as depicted in FIG. 3.

The forged bank note BNF will have pigments 21 of the luminescent feature substance incorporated all over the entire surface having length L and width B and uniformly distributed in the paper pulp, which the forger has gained from the combustion ash of the authentic bank notes BN. The reproduction of the predetermined distribution of the mottling fibers 20, which leads to local peaks of the measuring at predetermined positions of the bank note BN, the forger will not be able to carry out without an unreasonably high effort.

For this reason the curve of the luminescence intensity I measured under the same measurement conditions as in FIG. 2 has a largely uniform level ia without local peaks of high intensity, as they are caused by the mottling fibers 20 in authentic bank notes BN. Depending on the surface density or volume density of the pigments 21 the intensity ia of the forgery BNF here can be higher or lower than the intensity base level ib of the authentic bank notes BN.

Because of the difference between the measuring curve of the forgery BNF (FIG. 3, bottom) and the measuring curve to be expected of authentic bank notes BN (FIG. 2, bottom) the checked document BNF can be classified as a forgery in the evaluation unit 6.

Above there was described a special example of the invention. Of course, numerous alternatives are conceivable, some of which are described by way of example.

The luminescent feature substance can be incorporated into the paper of the bank notes BN and/or it can also be applied onto it e.g. by printing. Furthermore, the feature substance cannot only be incorporated into the bank note BN in different forms of incorporation, but also in only one form of incorporation, namely e.g. by distinctly increasing the concentration of the pigments 21 in the paper only selectively at few positions, in order to obtain the local peaks ic, or in general signal differences in contrast to the base signal, of the luminescence radiation I at an otherwise low base signal ib.

Moreover, the different forms of incorporation not necessarily have to be mottling fibers 20 and pigments 21. These can also be e.g. planchets or prints.

While in the above was described, that the same feature substance is incorporated into the paper with different concentrations, basically there can also be used different feature substances in different concentrations, at least as long as the measuring values of the luminescence radiation of these different feature substances do not significantly differ from each other when checked with a usual checking apparatus 2.

Furthermore, there can also be provided, that the different forms of incorporation 20, 21 have different feature substances or combinations of feature substances. E.g. the pigments 21 can consist of a first feature substance and the mottling fibers 20 of a combination of this first and a different second feature substance. Furthermore, in the bank note BN to be checked there can also be present e.g. different pigments 21 and/or different mottling fibers 20. This possibility, namely to not only provide one but a plurality of different feature substances in, optionally, also different combinations, can clearly increase the number of the possible codings of feature properties.

Accordingly, a spatial coding can be effected, too, by there being e.g. a plurality of different and checkable spatial arrangements of the mottling fibers 20 and/or pigments 21. When for coding, for example, three different feature substances are present and four different spatial arrangements of the feature substances in the different forms of incorporation are possible, already $3^4$, i.e. 81 different codings are available. With the help of the so-called "Wilcox"-method mottling fibers can be incorporated into the bank note paper in a very well-placed fashion. With that the number of the spatial codings of the feature substances can still be further increased.

It can also be provided, that different elements, e.g. mottling fibers, planchets, etc are used, which contain the same (or a plurality of) feature substances in different concentrations. In this way, too, a coding can be represented. Here it can also be provided, that the different elements are integrated into the bank note in a localized fashion or statistically spread.

The measurement of the luminescence radiation finally can also be effected e.g. not only along one, but also along a plurality of tracks and/or only at a plurality of discrete positions along a track.

The invention claimed is:

1. A sheet-shaped document of value, comprising:

a substrate comprising paper pulp; and a luminescent feature substance incorporated into the substrate;

wherein said luminescent feature substance is present uniformly throughout the substrate at a low concentration in the form of pigments, said low concentration being present over at least an entire surface of the substrate except where the luminescent feature substance is present at higher concentrations at certain partial areas of the substrate and wherein said same luminescent feature substance is present at the certain partial areas of the substrate at higher concentrations in the form of at least one of a mottling fiber, a planchet, or a print.

2. The document of value according to claim 1, wherein on illumination with a radiation exciting the luminescent feature substance of the document of value, the luminescent feature substance is configured to produce a luminescence radiation along a measured track having a uniformly distributed base intensity and one or a plurality of peaks with increased intensity only at certain positions of the track, wherein the one or a plurality of peaks corresponds to the certain partial areas having higher concentrations of said luminescent feature substance.

3. The document of value according to claim 1, wherein the luminescent feature substance is present in at least one of two different forms of application and incorporation.

4. The document of value according to claim 3, wherein at least one of the two different forms of application and incorporation uses a plurality of feature substances.

5. The document of value according to claim 1, wherein said certain partial areas comprise partial areas having increased concentrations of the luminescent feature substance, wherein said partial areas have different illumination intensities or geometric forms.

6. The document of value according to claim 1, wherein a quantity derived from a signal pattern of either or both the feature substance and a quantity derived from a statistical distribution of the signal pattern of the feature substance of the document of value is applied as information onto the document of value.

* * * * *